United States Patent
Wilhelmsson

(10) Patent No.: US 11,165,619 B2
(45) Date of Patent: Nov. 2, 2021

(54) LINK ADAPTATION FOR CONCURRENT OFDMA AND NON-OFDMA SIGNALING

(71) Applicant: Telefonaktiebolaget LM Ericsson (publ), Stockholm (SE)

(72) Inventor: Leif Wilhelmsson, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 363 days.

(21) Appl. No.: 16/344,482

(22) PCT Filed: Nov. 9, 2016

(86) PCT No.: PCT/EP2016/077155
§ 371 (c)(1),
(2) Date: Apr. 24, 2019

(87) PCT Pub. No.: WO2018/086685
PCT Pub. Date: May 17, 2018

(65) Prior Publication Data
US 2019/0268201 A1 Aug. 29, 2019

(51) Int. Cl.
*H04L 27/26* (2006.01)
*H04L 1/00* (2006.01)
(Continued)

(52) U.S. Cl.
CPC .......... *H04L 27/2628* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS

| | | | |
|---|---|---|---|
| 7,602,872 | B2 | 10/2009 | Suh et al. |
| 2008/0279291 | A1 | 11/2008 | Hassan et al. |

(Continued)

FOREIGN PATENT DOCUMENTS

| | | |
|---|---|---|
| CN | 101682449 A | 3/2010 |
| CN | 102083191 A | 6/2011 |

(Continued)

OTHER PUBLICATIONS

Zhongpei, Zhang, et al., "Analysis on Multi-Bandwidth UE Coexistence in OFDMA System", OFDMA; National Key Laboratory of Communications; University of Electronic Science and Technology of China; ZTE Communications, 2008, pp. 424-434.

(Continued)

*Primary Examiner* — Christine T Duong
(74) *Attorney, Agent, or Firm* — Murphy, Bilak Homiller, PLLC

(57) ABSTRACT

A link adaptation method is disclosed of a network node adapted to operate in concurrent association with one or more orthogonal frequency division multiple access (OFDMA) wireless communication devices using OFDMA signaling, and a non-OFDMA wireless communication device using non-OFDMA signaling. The non-OFDMA signaling has a bandwidth that is smaller than a maximum bandwidth of the OFDMA signaling. The method comprises excluding one or more sub-carriers from the OFDMA signaling to create a frequency gap and determining a center frequency of the non-OFDMA signaling such that the center frequency is within the frequency gap. The method also comprises selecting a modulation and coding scheme to be used for the OFDMA signaling based on a first signal-to-interference value. In the first signal-to-interference value, the non-OFDMA signaling acts as interference to the (Continued)

OFDMA signaling. Corresponding computer program product, arrangement and network node are also disclosed.

20 Claims, 3 Drawing Sheets

(51) Int. Cl.
*H04L 5/00* (2006.01)
*H04L 27/00* (2006.01)

(52) U.S. Cl.
CPC .......... *H04L 1/0009* (2013.01); *H04L 5/0062* (2013.01); *H04L 27/0006* (2013.01)

(56) References Cited

U.S. PATENT DOCUMENTS

| | | |
|---|---|---|
| 2009/0302966 A1* | 12/2009 | Ibrahim ............... H04B 1/1036 333/12 |
| 2010/0002675 A1 | 1/2010 | Fu et al. |
| 2010/0214928 A1 | 8/2010 | Nogami et al. |
| 2012/0087266 A1 | 4/2012 | Vajapeyam et al. |
| 2012/0320826 A1 | 12/2012 | Kim et al. |
| 2013/0121186 A1 | 5/2013 | Vajapeyam et al. |
| 2014/0086299 A1 | 3/2014 | Pustovalov et al. |
| 2014/0211872 A1 | 7/2014 | Hassan et al. |
| 2015/0304146 A1 | 10/2015 | Yang et al. |
| 2015/0319763 A1* | 11/2015 | Abdelmonem ........ H04B 17/21 370/230 |
| 2016/0227599 A1 | 8/2016 | Lee et al. |
| 2017/0094660 A1 | 3/2017 | Frederiksen et al. |
| 2017/0230970 A1 | 8/2017 | Kim et al. |
| 2019/0268201 A1 | 8/2019 | Wilhelmsson |

FOREIGN PATENT DOCUMENTS

| | | |
|---|---|---|
| CN | 102739581 A | 10/2012 |
| CN | 103001918 A | 3/2013 |
| CN | 103068057 A | 4/2013 |
| CN | 103155455 A | 6/2013 |
| CN | 103931258 A | 7/2014 |
| CN | 104823402 A | 8/2015 |
| EP | 1798924 A1 | 6/2007 |
| EP | 3001623 A1 | 3/2016 |
| EP | 3539233 A1 | 9/2019 |
| JP | 2008245190 A | 10/2008 |
| JP | 2009246516 A | 10/2009 |
| JP | 2009296199 A | 12/2009 |
| JP | 2017516356 A | 6/2017 |
| JP | 2020511800 A | 4/2020 |
| RU | 2366097 C2 | 8/2009 |
| WO | 2007034860 A1 | 3/2007 |
| WO | 2007063519 A2 | 6/2007 |
| WO | 2011000109 A1 | 1/2011 |
| WO | 2011112004 A2 | 9/2011 |
| WO | 2014151150 A1 | 9/2014 |
| WO | 2016018125 A1 | 2/2016 |
| WO | 2018086685 A1 | 5/2018 |

OTHER PUBLICATIONS

"On coexistence of new waveforms for NR", 3GPP TSG RAN WG1 Meeting #85; R1-164327; Nanjing, China, May 23-28, 2016, pp. 1-12.

Ku, Gwanmo, et al., "Resource Allocation and Link Adaptation in LTE and LTE Advanced: A Tutorial", IEEE Communication Surveys & Tutorials, vol. 17, No. 3, 3rd Quarter 2015, pp. 1605-1633.

Stacey, Robert, "Specification Framework for TGax", IEEE P802.11 Wireless LANs, Doc.:IEEE 802.11-15/0132r15, Mar. 17, 2016, pp. 1-49.

* cited by examiner

LINK ADAPTATION FOR CONCURRENT OFDMA AND NON-OFDMA SIGNALING

TECHNICAL FIELD

The present invention relates generally to the field of wireless communication. More particularly, it relates to coexistence of OFDMA (orthogonal frequency division multiple access) signaling and non-OFDMA signaling.

BACKGROUND

There are numerous scenarios where coexistence of OFDMA and non-OFDMA signaling may be beneficial. Such a type of scenario, which will be used herein as an illustrative example, is one where the concept of Internet of Things (IoT) is becoming prominent in wireless communication.

Internet of Things is expected to increase the number of connected communication devices significantly. Many of these devices may typically operate in unlicensed bands, for example, in the 2.4 GHz ISM (industrial, scientific and medical) band. Example communication standards that are expected to be prominent in IoT services are Bluetooth Wireless Technology (hereinafter Bluetooth), in particular Bluetooth Low Energy (BLE) and future versions of IEEE 802.11 like 802.11ax., It can also be expected that future versions of IEEE 802.11 may support more efficient narrowband transmissions in order to allow for lower cost implementations and more energy efficient communication, herein referred to as NB-WiFi. It can also be expected that such a NB-WiFi version would at least partly build on 802.11ax.

Supposedly, IoT applications typically require low data rate (small amounts of data per transmission and/or scares transmissions). However, since the number of IoT devices may be extremely large, the aggregated IoT data rate may still be substantial.

The typically required coverage range for IoT communication is expected to be substantially less than that provided by cellular communication systems, while the coverage which can be obtained by e.g. conventional Bluetooth or 802.11b/g/n/ac may not suffice. Coverage may be increased by reducing the data rate, which implies that a certain amount of data will take longer time to transmit while occupying the communication channel. This may lead to congestion if a large number of devices share the channel as is expected for IoT.

There is also a trend towards use of the unlicensed bands for communication services that are traditionally supported in licensed bands. For example, the third generation partnership project (3GPP) have developed versions of their Long Term Evolution (LTE) standard, for operation in the 5 GHz unlicensed band.

To obtain good performance for both IoT applications and non-IoT applications, coordination of the communication may be beneficial. Coordination by time sharing of the channel may be inferior, since the data rate is very low for the individual links in IoT, which may lead to poor spectrum efficiency.

The non-IoT communication may, typically, use OFDMA signaling. EP 1798924 A1 discloses a solution where, for a first (OFDM) communication system, carrier frequencies within a frequency range are temporarily disabled to provide the frequency range for a second communication system. A problem is that the first and second communication system may interfere with each other.

Therefore, there is a need for link adaptation approaches in scenarios where OFDMA signaling and non-OFDMA signaling coexist.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect, this is achieved by a link adaptation method of a network node. The network node is adapted to operate in concurrent association with one or more orthogonal frequency division multiple access (OFDMA) wireless communication devices using OFDMA signaling, and a non-OFDMA wireless communication device using non-OFDMA signaling. The non-OFDMA signaling has a bandwidth that is smaller than a maximum bandwidth of the OFDMA signaling.

The method comprises excluding one or more sub-carriers from the OFDMA signaling to create a frequency gap and determining a center frequency of the non-OFDMA signaling such that the center frequency is within the frequency gap. The method also comprises selecting a modulation and coding scheme to be used for the OFDMA signaling based on a first signal-to-interference value, wherein the non-OFDMA signaling acts as interference to the OFDMA signaling.

The network node may, for example, be an access point (AP) adapted to operate in accordance with IEEE 802.11 or another standard using OFDMA signaling and in accordance with Bluetooth or another standard using non-OFDMA signaling. The OFDMA wireless communication devices may each be, for example, a user equipment (UE) or station (STA) adapted to operate in accordance with IEEE 802.11 or another standard using OFDMA signaling. The non-OFDMA wireless communication device may, for example, be a user equipment (UE) or station (STA) adapted to operate in accordance with Bluetooth (e.g. BLE) or another standard using non-OFDMA signaling. The OFDMA signaling may, for example, be adapted to support data rates in relation to each wireless communication device that are (substantially) higher than the data rates in relation to each wireless communication device that the non-OFDMA signaling is adapted to support.

The non-OFDMA signaling may, for example, have a bandwidth that is substantially smaller than the maximum bandwidth of the OFDMA signaling, e.g. less than or approximately equal to a tenth of the maximum bandwidth of the OFDMA signaling.

The created frequency gap may, for example, be approximately equal to the bandwidth of the non-OFDMA signaling.

The sub-carriers to be excluded may, for example, be adjacent sub-carriers. For example, the sub-carriers to be excluded may be those of a (e.g. smallest) resource unit (RU) of the OFDMA signaling.

The center frequency may, for example, be determined to be (approximately) centered in the created frequency gap. Determining the center frequency of the non-OFDMA signaling to be within the created frequency gap may, for example, be achieved by frequency shifting either or both of the OFDMA signaling and the non-OFDMA signaling, if needed.

The selection of the modulation and coding scheme to be used for the OFDMA signaling may, for example, comprise (for a number of potential modulation and coding schemes) comparing the first signal-to-interference value with a signal-to-interference threshold associated with the potential modulation and coding scheme, and selecting one of the potential modulation and coding schemes for which the first signal-to-interference value is greater than the associated signal-to-interference threshold. For example, the selected modulation and coding schemes may be the one providing best capacity (and/or being least robust) among the potential modulation and coding schemes for which the first signal-to-interference value is greater than the associated signal-to-interference thresholds.

In some embodiments, selecting the modulation and coding scheme to be used for the OFDMA signaling may comprise selecting a nominal modulation and coding scheme for the OFDMA signaling, and adjusting the modulation and coding scheme of sub-carriers adjacent to the frequency gap to a modulation and coding scheme that is more robust than the nominal modulation and coding scheme. Adjacent may indicate directly adjacent only or a collection (e.g. a resource unit) including the directly adjacent.

Robustness of modulation and coding schemes may be defined in terms of coding rate, bits per symbol of the modulation, packet size, or a combination thereof. For example, a modulation and coding scheme may be considered more robust if it has lower coding rate and/or less bits per symbol than another modulation and coding scheme. A typical characteristic of a more robust modulation and coding scheme may be that it can be expected to achieve the same error rate as a less robust modulation and coding scheme already for a smaller signal-to-interference-ratio (SIR).

According to some embodiments, the method may further comprise selecting a modulation and coding scheme to be used for the non-OFDMA signaling based on a second signal-to-interference value, wherein the OFDMA signaling acts as interference to the non-OFDMA signaling. The selection of the modulation and coding scheme to be used for the non-OFDMA signaling may, for example, comprise similar considerations as explained above for the selection of the modulation and coding scheme to be used for the OFDMA signaling. In some embodiments, the potential modulation and coding schemes be used for the non-OFDMA signaling may be different modes of Bluetooth communication.

In some embodiments wherein first and second transmission power levels are for the OFDMA and non-OFDMA signaling, respectively, the method may further comprise selecting at least one of the first and second transmission power level based on a first signal-to-interference condition, thereby adapting the first (and the second) signal-to-interference value.

Selection of the at least one of the first and second transmission power level may, for example, comprise selecting at least one of the first and second transmission power level such that the first signal-to-interference value is greater than a minimum signal-to-interference value associated with the OFDMA signaling (first signal-to-interference condition).

Additionally or alternatively, selection of the at least one of the first and second transmission power level may, for example, comprise selecting at least one of the first and second transmission power level such that the second signal-to-interference value is greater than a minimum signal-to-interference value associated with the non-OFDMA signaling.

According to some embodiments, the method may further comprise adapting the first (and the second) signal-to-interference value by selecting the number of the one or more excluded sub-carriers based on a second signal-to-interference condition.

Selection of the number of the one or more excluded sub-carriers may, for example, comprise selecting the number such that the worst case first signal-to-interference value is greater than a minimum signal-to-interference value associated with the OFDMA signaling (second signal-to-interference condition).

The OFDMA and non-OFDMA signaling may, according to some embodiments, comprise downlink (DL) signals and the method may further comprise concurrently transmitting the downlink signals.

Excluding the one or more sub-carriers from the OFDMA signaling may comprise setting corresponding inputs of an inverse fast Fourier transformer (IFFT) to zero.

The OFDMA and non-OFDMA signaling may, according to some embodiments, comprise uplink (UL) signals. Then, the method may further comprise sending (to the OFDMA wireless communication devices) respective messages indicative of the excluded sub-carriers and the selected modulation and coding scheme to be used for OFDMA signaling and sending (to the non-OFDMA wireless communication device) a message indicative of the center frequency.

Messages (the same as, or different from, the messages above) may also indicate other transmission parameters, such as one or more of selected modulation and coding scheme to be used for non-OFDMA signaling, first and/or second transmission power levels, etc.

A message to an OFDMA wireless communication device indicating sub-carriers to be used for uplink transmission, wherein the sub-carriers to be used do not comprise or overlap with the excluded sub-carriers, is intended to be an example of a message indicative of the excluded sub-carriers.

The method may, in some embodiments, further comprise concurrently receiving the uplink signals from the OFDMA wireless communication devices and from the non-OFDMA wireless communication device, extracting the OFDMA signaling by excluding the one or more sub-carriers from an OFDMA demodulated signal, and extracting the non-OFDMA signaling by filtering. Exclusion of the one or more sub-carriers from the OFDMA demodulated signal may typically comprise exclusion of sub-carriers corresponding to the non-OFDMA signaling.

Excluding the one or more sub-carriers from the OFDMA demodulated signal may comprise setting corresponding outputs of an IFFT to zero, or may comprise ignoring corresponding outputs of the IFFT. Ignoring some outputs of the IFFT may comprise not using the outputs in the OFDMA demodulation.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is a link adaptation arrangement for a network node. The network node is adapted to operate in concurrent association with one or more orthogonal frequency division multiple access (OFDMA) wireless communication devices using OFDMA signaling, and a non-OFDMA wireless communication device using non-OFDMA signaling. The non-OFDMA signaling has a bandwidth that is smaller than a maximum bandwidth of the OFDMA signaling.

The arrangement comprising a controller adapted to cause exclusion (e.g. by a frequency gap creator) of one or more sub-carriers from the OFDMA signaling to create a frequency gap, determination (e.g. by a center frequency determiner) of a center frequency of the non-OFDMA signaling such that the center frequency is within the frequency gap, and selection (e.g. by a modulation and coding scheme selector) of a modulation and coding scheme to be used for the OFDMA signaling based on a first signal-to-interference value, wherein the non-OFDMA signaling acts as interference to the OFDMA signaling.

In some embodiments, the controller may be further adapted to cause selection (e.g. by the same or a different modulation and coding scheme selector) of a modulation and coding scheme to be used for the non-OFDMA signaling based on a second signal-to-interference value, wherein the OFDMA signaling acts as interference to the non-OFDMA signaling.

According to some embodiments, wherein first and second transmission power levels are for the OFDMA and non-OFDMA signaling, respectively, the controller may be further adapted to cause selection (e.g. by a power level selector) of at least one of the first and second transmission power level based on a first signal-to-interference condition, thereby causing adaption of the first signal-to-interference value.

According to some embodiments, the controller may be further adapted to cause adaption of the first signal-to-interference value by causing selection (e.g. by the frequency gap creator in combination with a bandwidth selector) of the number of the one or more excluded sub-carriers based on a second signal-to-interference condition.

In some embodiments, wherein the OFDMA and non-OFDMA signaling comprise downlink signals, the controller may be further adapted to cause concurrent transmission (e.g. by a transmitter/transceiver) of the downlink signals.

In some embodiments, wherein the OFDMA and non-OFDMA signaling comprise uplink signals, the controller may be further adapted to cause sending (to the OFDMA wireless communication devices, e.g. by a transmitter/transceiver) of respective messages indicative of the excluded sub-carriers and the selected modulation and coding scheme, and sending (to the non-OFDMA wireless communication device, e.g. by a transmitter/transceiver) of a message indicative of the center frequency.

The controller may, according to some embodiments, be further adapted to cause concurrent reception (e.g. by a receiver/transceiver) of the uplink signals from the OFDMA wireless communication devices and from the non-OFDMA wireless communication device, extraction of the OFDMA signaling by exclusion of the one or more sub-carriers from an OFDMA demodulated signal and extraction of the non-OFDMA signaling by filtering. Exclusion of the one or more sub-carriers from the OFDMA demodulated signal may typically comprise exclusion of sub-carriers corresponding to the non-OFDMA signaling.

A fourth aspect is a network node comprising the arrangement according to the third aspect.

In some embodiments, any of the above aspects may additionally have features identical with or corresponding to any of the various features as explained above for any of the other aspects.

An advantage of some embodiments is that coexistence of OFDMA signaling and non-OFDMA signaling is enabled.

Another advantage of some embodiments is that time division is avoided.

BRIEF DESCRIPTION OF THE DRAWINGS

Further objects, features and advantages will appear from the following detailed description of embodiments, with reference being made to the accompanying drawings, in which.

DETAILED DESCRIPTION

Embodiments described herein enable an IoT system (typically with low data rate) and a non-IoT system (typically with high data rate) to operate concurrently by having the non-IoT system use OFDMA, assigning one or more sub-carriers to the IoT system, and using the remaining sub-carriers for the non-IoT system. An advantage with this approach is that the amount of sub-carriers allocated to the IoT system may be rather flexible.

Using OFDM is conceptually simple and is already the approach used in e.g. IEEE802.11ah, which is a standard developed to be used below 1 GHz. However, OFDM is probably not a good choice for IoT communication since parameters such as, e.g., power consumption, cost, and simplicity of implementation are particularly important in many IoT devices. Therefore, a more appropriate choice for IoT communication may, for example, be Gaussian Frequency Shift Keying (GFSK) as used in BLE.

Embodiments provide an approach to combining two different physical layers (PHY) where one PHY is intended for high data rate communications (using OFDMA) and the other PHY is intended for low data rate communications (using non-OFDMA, e.g. IoT communication). The signals of the two PHY:s may not be perfectly orthogonal to one another. Hence, in order to ensure proper operation for both types of signals, interference between the two PHY:s should preferably be taken into account when selecting transmission parameters such as, e.g., modulation and coding schemes and transmission power levels.

In the following, embodiments will be described where at least one of a link (or a plurality of links) used for OFDMA and a link used for non-OFDMA are adapted to accommodate concurrent OFDMA and non-OFDMA operation in a frequency efficient manner. The (joint) link adaptation (LA) may comprise adaptation of one or more of the modulation and coding scheme, the transmission power level, and the frequency allocation for one or more of the links involved.

Figure 1:
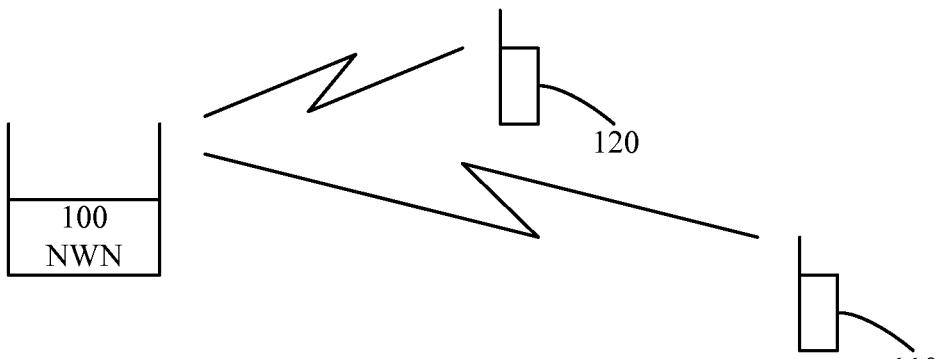
FIG. 1 is a schematic drawing illustrating an example scenario where some embodiments may be applicable.

FIG. 1 illustrates an example scenario where some embodiments may be applicable. In the example scenario a network node (NWN) 100 is adapted to operate in concurrent association with one or more OFDMA wireless communication devices 120 using OFDMA and a non-OFDMA wireless communication device 110 using non-OFDMA. The non-OFDMA signal typically has a bandwidth that is smaller than a maximum bandwidth of the OFDMA signal. The OFDMA signal may, for example, be in accordance with an IEEE 802.11 standard (e.g. IEEE 802.11ax) and the non-OFDMA signal may, for example, be in accordance with a Bluetooth standard (e.g. Bluetooth Low Energy—BLE).

Figure 2:
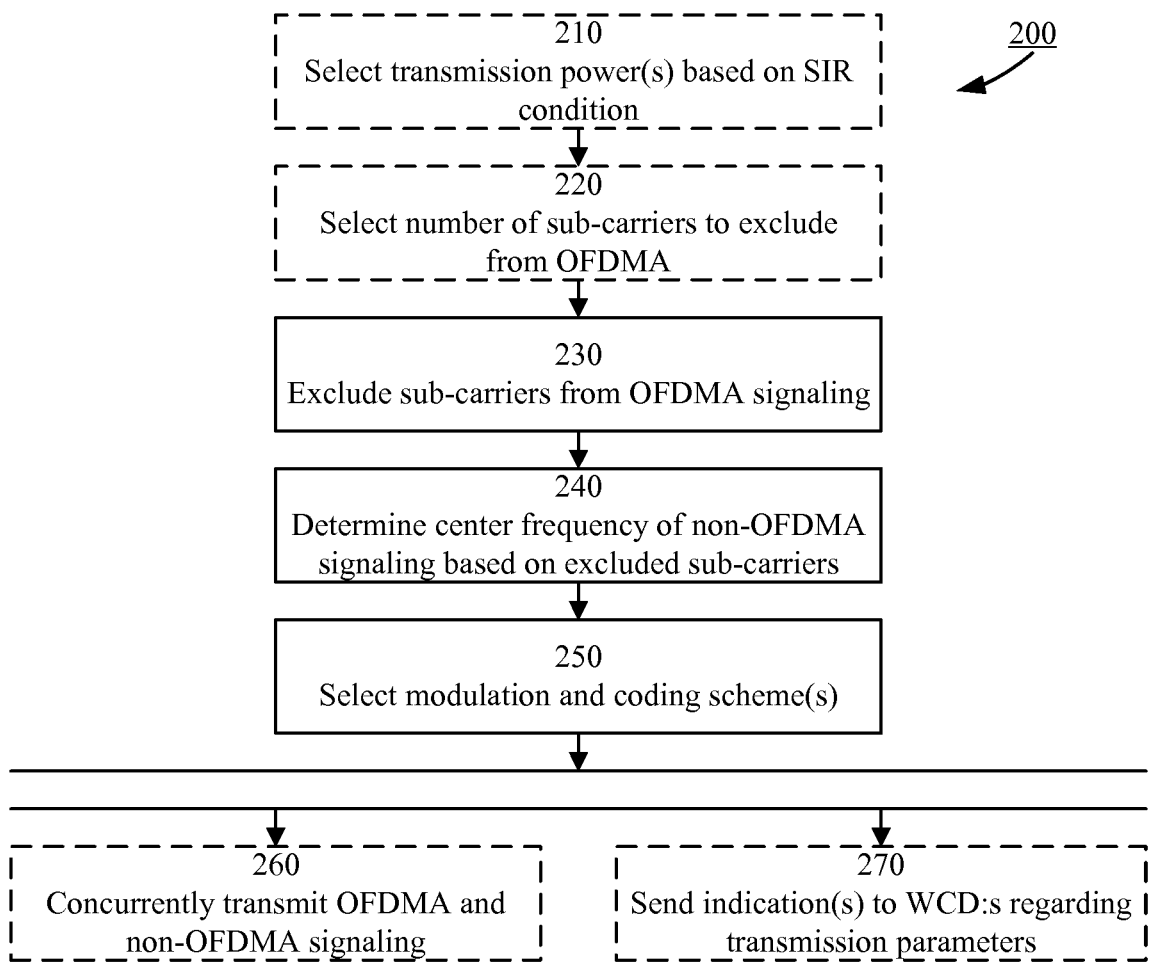
FIG. 2 is a flowchart illustrating example method steps according to some embodiments.

FIG. 2 illustrates an example method 200 according to some embodiments.

The example method 200 may, for example, be performed in the network node 100 of FIG. 1.

It is to be noted that various steps of the example method 200 may be optional (as indicated by dashed boxes). Furthermore, it should be noted that even though the various steps of the example method 200 are described as performed in a certain order, this is not to be considered as limiting. Contrarily, steps may be performed in another order while still falling under the scope of the claims. For example, step 250 may be performed before step 240 and even before step 230; step 240 may be performed before step 230; steps 210-250 (or a selection thereof) may be performed iteratively; etc.

The method starts in step 210, where transmission power levels for the links involved are selected. In some embodiments, all links may have variable transmission power levels, while in other embodiments, some links may have transmission power levels that are not varied in the context presented herein (although they may be otherwise variable).

The transmission power levels are selected based on a signal-to-interference condition. For example, the selection may be such that a resulting signal-to-interference value (wherein the non-OFDMA signal acts as interference to the OFDMA signal) is greater than a minimum acceptable signal-to-interference value associated with the OFDMA signaling. Additionally or alternatively, the selection may be such that a resulting signal-to-interference value (wherein the OFDMA signal acts as interference to the non-OFDMA signal) is greater than a minimum acceptable signal-to-interference value associated with the non-OFDMA signal.

In step 220, a number of sub-carriers of the OFDMA signal are selected, which sub-carriers are excluded from OFDMA signal in step 230, whereby a frequency gap is created in the OFDMA signal. The frequency gap is for accommodating the non-OFDMA signal, and in step 240 a center frequency of the non-OFDMA signal is determined such that the center frequency of the non-OFDMA signal is within (typically approximately centered in) the frequency gap.

Typically, the number of the sub-carriers to exclude is based on the bandwidth of the non-OFDMA signal. For example, the sub-carriers to be excluded may be those of a (e.g. smallest) resource unit (RU) of the OFDMA signal if the non-OFDMA signal can be accommodated therein and sub-carriers of more than one RU (or a larger RU) may be excluded if the bandwidth of the non-OFDMA signal so requires.

Selection of the number of the sub-carriers to exclude may imply adaption of signal-to-interference values of the OFDMA and the non-OFDMA signals. Hence, the number may be selected based on one or more signal-to-interference conditions in a similar manner as explained for the transmission power level selection of step 210.

In some embodiments, the bandwidth of the non-OFDMA signal may be variable. For example, a larger bandwidth may be used to be able to avoid a high transmission power level and/or to be able to use a particular modulation and coding scheme. Then, the selection of step 220 should preferably be correspondingly variable.

In step 250, the modulation and coding scheme to be used for the OFDMA signal is selected. The selection is based on the signal-to-interference value, wherein the non-OFDMA signal acts as interference to the OFDMA signal.

The selection of the modulation and coding scheme to be used for the OFDMA signaling may, for example, comprise (for a number of potential modulation and coding schemes) comparing the signal-to-interference value with a signal-to-interference threshold associated with the potential modulation and coding scheme, and selecting one of the potential modulation and coding schemes for which the signal-to-interference value is greater than the associated signal-to-interference threshold.

Typically, the selected modulation and coding scheme to be used for the OFDMA signal comprises a nominal modulation and coding scheme for the OFDMA signal and an adjusted modulation and coding scheme for one or more sub-carriers adjacent to (or close to) the frequency gap, where the adjusted modulation and coding scheme is more robust than the nominal modulation and coding scheme.

The selection in step 250 may also include selecting a modulation and coding scheme to be used for the non-OFDMA signal. This selection is based on a signal-to-interference value, wherein the OFDMA signal acts as interference to the non-OFDMA signal in a similar manner as explained above for the selection of the modulation and coding scheme to be used for the OFDMA signal.

The coexistence of OFDMA and non-OFDMA may be relevant for uplink and/or downlink communication.

For downlink communication, the method may further comprise concurrently transmitting the downlink OFDMA and non-OFDMA signals, as illustrated in step 260.

For uplink communication, the method may further comprise sending indications regarding transmission parameters to the wireless communication devices (WCD), as illustrated in step 270. Such transmission parameters may include a relevant selection of the parameters of one or more of steps 210, 220, 240 and 250. Typically, at least the excluded sub-carriers (possibly in the form of an uplink allocation not overlapping with the excluded sub-carriers) and the selected coding and modulation scheme may be indicated to the OFDMA wireless communication devices, and at least the center frequency may be indicated to the non-OFDMA wireless communication device.

For uplink communication, the method may further comprise concurrently receiving the uplink signals from the OFDMA wireless communication devices and from the non-OFDMA wireless communication device (not shown in FIG. 2).

When the joint LA is performed for the downlink, the OFDMA and non-OFDMA signals are transmitted from the network node, which is the same node as is coordinating the selection of parameters (modulation and coding schemes, transmission power levels, number of sub-carriers to exclude, etc.) for the link adaptation. The network node may, thus, decide how to adjust the parameters on the fly (e.g. on a packet-by-packet basis) and the joint LA may be completely transparent to the receivers of the downlink signals.

When the joint link LA is performed for the uplink, the selection of parameters may (at least partly) be based on information from the network node to the wireless communication devices (e.g. instructions) and/or vice versa (e.g. measurement reports). Thus, the joint LA will not be completely transparent to the transmitters of the uplink signals. However, instructions from the network node do not have to convey the reason for the link adaptation instructions to the wireless communication devices. Furthermore, it may be advantageous to select parameters in uplink scenarios such that there are margins to a channel situation where communications fail.

Figure 3:
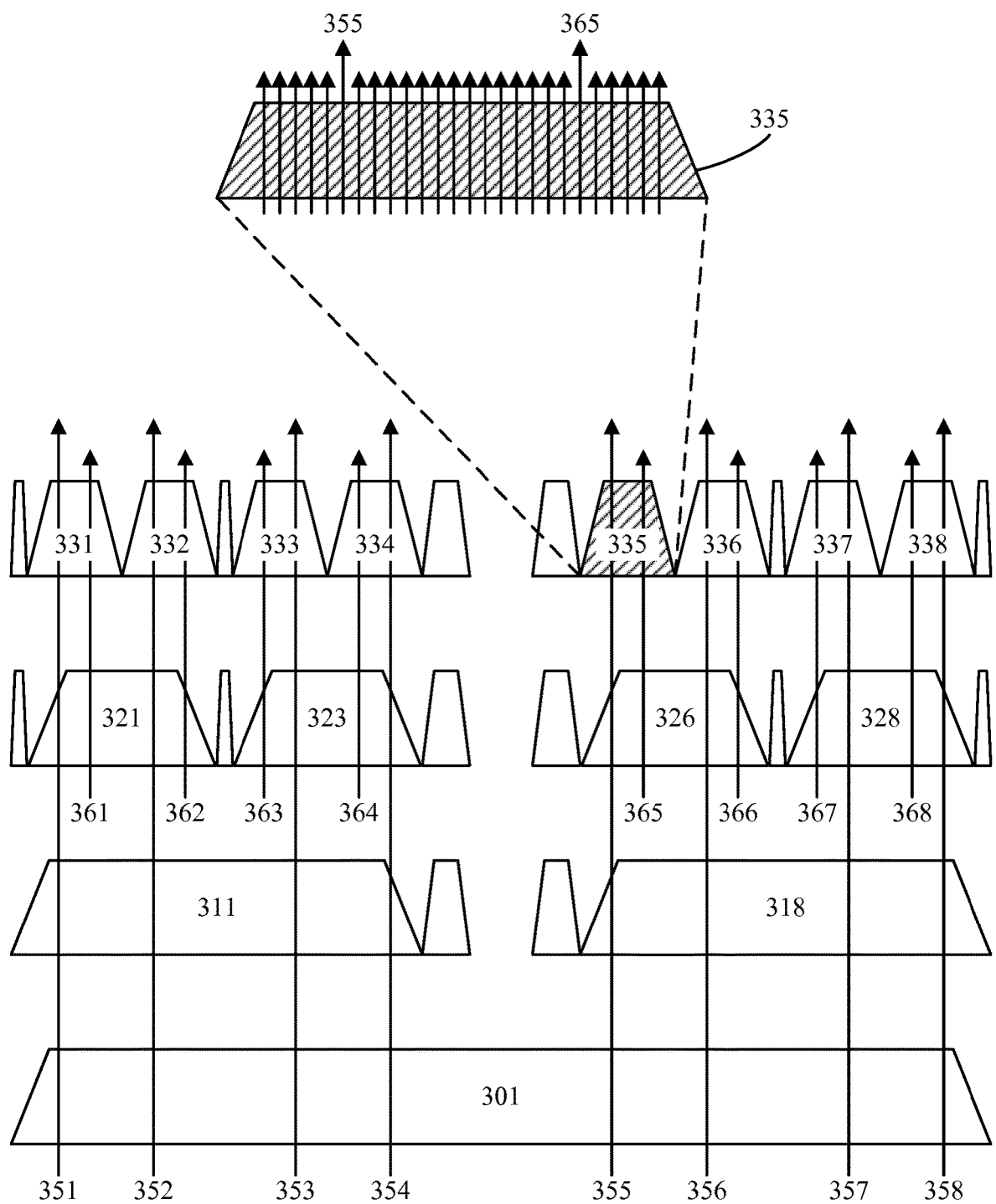
FIG. 3 is a schematic illustration of OFDMA signaling that may be relevant in relation to some embodiments.

FIG. 3 schematically illustrates a typical partition of a frequency spectrum for OFDMA signaling into resources units (RU:s) of different sizes. The particular example shown in FIG. 3 may, for example, relate to 20 MHz allocation in IEEE 802.11ax (see e.g. IEEE P802.11 Wireless LANs, "Specification Framework for TGax", doc.:IEEE 802.11-15/0132r8, September 2015, FIG. 11). According to this example, the frequency spectrum may be used for a single RU 301; for two RU:s 311, 318; for four RU:s 321, 323, 326, 328; or for eight RU:s 331, 332, 333, 334, 335, 336, 337, 338. Pilot tones are represented as arrows 351-358 and 361-368. In relation to the method described in connection with FIG. 2, RU 335 may be excluded from OFDMA signaling and used for non-OFDMA signaling, for example.

Figure 4:
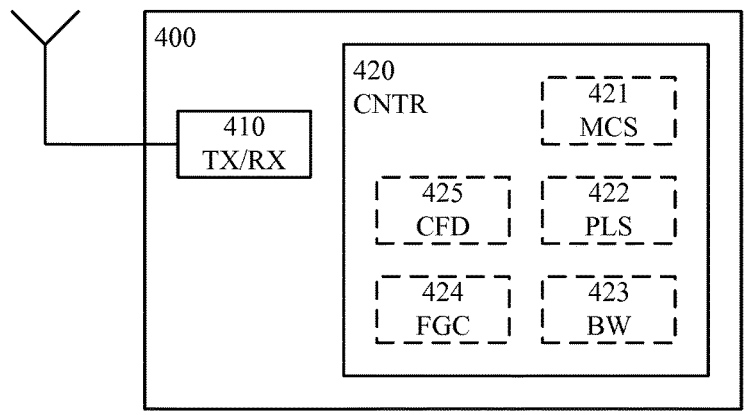
FIG. 4 is a schematic block diagram illustrating an example arrangement according to some embodiments.

FIG. 4 schematically illustrates an example arrangement 400 that may, for example, be adapted to perform the method described in connection with FIG. 2.

The arrangement 400 may be comprised in a network node adapted to operate in concurrent association with one or more OFDMA wireless communication devices using OFDMA and a non-OFDMA wireless communication device using non-OFDMA. The non-OFDMA signal has a bandwidth that is smaller than a maximum bandwidth of the OFDMA signal.

The arrangement 400 comprises a controller (CNTR) 420 and may possibly also comprise a transmitter and/or a receiver (illustrated in FIG. 4 as a transceiver (TX/RX) 410). Furthermore, the controller 420 may comprise, or be otherwise associated with, one or more of a modulation and coding scheme selector (MCS) 421, a power level selector (PLS) 422, a bandwidth selector (BW) 423, a frequency gap creator (FGC) 424, and a center frequency determiner (CFD) 425.

The controller 420 may be adapted to cause execution of the steps as described in connection to FIG. 2. Thus, the controller is adapted to cause exclusion of one or more sub-carriers from the OFDMA signaling to create a frequency gap (compare with step 230) and determination of a center frequency of the non-OFDMA signaling such that the center frequency is within the frequency gap (compare with step 240). The exclusion may be caused by the frequency gap creator 424 and the determination may be caused by the center frequency determiner 425.

The controller is also adapted to cause selection of a modulation and coding scheme (compare with step 250) to be used for the OFDMA signal based on a first signal-to-interference value, wherein the non-OFDMA signal acts as interference to the OFDMA signal. In some embodiments, the controller may be further adapted to cause selection of a modulation and coding scheme (compare with step 250) to be used for the non-OFDMA signal based on a second signal-to-interference value, wherein the OFDMA signal acts as interference to the non-OFDMA signal. The selection(s) of modulation and coding scheme(s) may be caused by one or more modulation and coding scheme selectors 421.

The controller may also be adapted to cause selection of transmission power level for at least one of the OFDMA and non-OFDMA signals based on a first signal-to-interference condition (compare with step 210). The selection of transmission power level(s) may be caused by the power level selector 422.

According to some embodiments, the controller may be further adapted to cause selection of the number of the one or more excluded sub-carriers based on a second signal-to-interference condition (compare with step 220). The selection of the number may be caused by the frequency gap creator in combination with the bandwidth selector 423. When the OFDMA and non-OFDMA signals comprise downlink signals, the controller may be further adapted to cause concurrent transmission by the transceiver 410 of the downlink signals (compare with step 260).

When the OFDMA and non-OFDMA signals comprise uplink signals, the controller may be further adapted to cause (compare with step 270) sending by the transceiver 410 to the OFDMA wireless communication devices of respective messages indicative of the excluded sub-carriers and the selected modulation and coding scheme, and sending by the transceiver 410 to the non-OFDMA wireless communication device of a message indicative of the center frequency. The controller may be further adapted to cause concurrent reception by the transceiver 410 of the uplink signals from the OFDMA wireless communication devices and from the non-OFDMA wireless communication device, extraction of the OFDMA signal by exclusion of the one or more sub-carriers from an non-OFDMA demodulated signal, and extraction of the non-OFDMA signal by filtering. Exclusion of the one or more sub-carriers from the OFDMA demodulated signal may typically comprise exclusion of sub-carriers corresponding to the non-OFDMA signaling.

Figure 5:
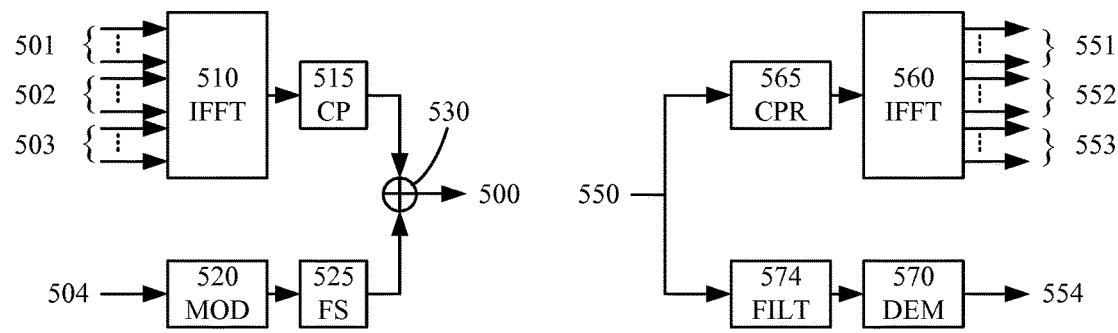
FIG. 5 is a schematic block diagram illustrating example transmitter and receiver arrangements according to some embodiments.

FIG. 5 schematically illustrate example transmitter and receiver arrangements according to some embodiments. The arrangements of FIG. 5 may, for example, be comprised in the transceiver 410 of FIG. 4 and may be (at least partly) controlled by the controller 420 of FIG. 4.

In the example transmitter, one or more sub-carriers are excluded from the OFDMA signal by setting the corresponding inputs of an inverse fast Fourier transformer (IFFT) 510 to zero. For example, the inputs indicated by 502 may be set to zero while the inputs indicated by 501, 503 are treated as normally for OFDMA signaling (compare with the use of the frequencies of RU 335 in FIG. 3 for non-OFDMA signaling). The setting of some inputs of the IFFT 510 to zero may be caused by the frequency gap creator 424 of FIG. 4.

The input 504 for the non-OFDMA signal is modulated in modulator (MOD) 520 and frequency shifted by frequency shifter (FS) 525 such that its center frequency is within the frequency gap created by exclusion of sub-carriers from OFDMA signal. The frequency shifter 525 may be controlled by the center frequency determiner 425 of FIG. 4.

The output of the IFFT 510 is pre-appended with a cyclic prefix (CP) 515, as is commonly known in the art, and combined with the non-OFDMA signal by combiner 530 to a signal 500 for concurrent downlink transmission. The combiner 530 may be controlled by the power level selector 422 of FIG. 4, such that the signals are correspondingly weighted before combined.

In the example receiver, uplink signals 550 from the OFDMA wireless communication devices and from the non-OFDMA wireless communication device are concurrently received.

Extraction of the OFDMA signal is achieved, after cyclical prefix removal (CPR) 565, by exclusion of the one or more sub-carriers from the OFDMA demodulated signal, which is achieved by setting corresponding outputs of an IFFT 560 to zero, or by ignoring corresponding outputs of the IFFT. For example, the outputs indicated by 552 (corresponding to inputs 502 of the transmitter) may be set to zero or ignored, while the outputs indicated by 551, 553 are treated as normally for OFDMA signaling. The setting of some outputs of the IFFT 560 to zero (or the ignoring of some outputs) may be caused by the frequency gap creator 424 of FIG. 4.

Extraction of the non-OFDMA signal 554 is achieved by filtering out the relevant frequency interval by filter (FILT) 574 and demodulating the filtered signal in demodulator (DEM) 570. The demodulation may include applying the inverse of the frequency shift applied by frequency shifter 525. The filter 574 may be controlled by the bandwidth selector 423 of FIG. 4.

The modulation and coding scheme selector 421 of FIG. 4 may control one or more of the modulator 520 and the demodulator 570. Alternatively or additionally, the modulation and coding scheme selector 421 of FIG. 4 may control the processing of OFDMA signals before input into the IFFT 510 and after output from the IFFT 560. The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a network node) comprising arrangements/circuitry/logic or performing methods according to any of the embodiments. The electronic apparatus may, for example, be an access point.

Figure 6:
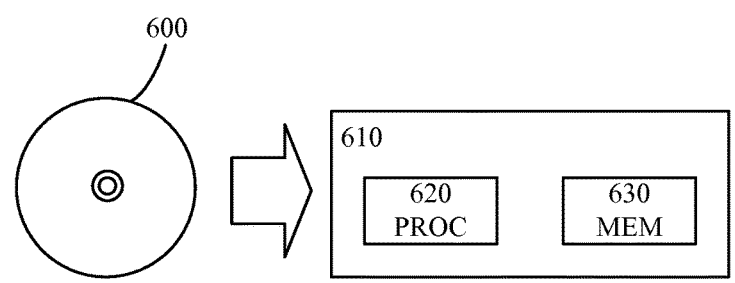
FIG. 6 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 600 illustrated in FIG. 6. The computer readable medium may have stored thereon a computer program comprising program instructions. The computer program may be loadable into a data-processing unit (PROC) 620, which may, for example, be comprised in a network node 610. When loaded into the data-processing unit, the computer program may be stored in a memory (MEM) 630 associated with or integral to the data-processing unit. According to some embodiments, the computer program may, when loaded into and run by the data-processing unit, cause execution of method steps according to, for example, the method shown in FIG. 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A link adaptation method of a network node adapted to operate in concurrent association with one or more orthogonal frequency division multiple access (OFDMA) wireless communication devices using OFDMA signaling, and with a non-OFDMA wireless communication device using non-OFDMA signaling having a bandwidth that is smaller than a maximum bandwidth of the OFDMA signaling, the method comprising:
- excluding one or more sub-carriers from the OFDMA signaling to create a frequency gap;
- determining a center frequency of the non-OFDMA signaling such that the center frequency is within the frequency gap; and
- selecting a modulation and coding scheme to be used for the OFDMA signaling based on a first signal-to-interference value, wherein the non-OFDMA signaling acts as interference to the OFDMA signaling.

2. The method of claim 1, wherein selecting the modulation and coding scheme to be used for the OFDMA signaling comprises:
- selecting a nominal modulation and coding scheme for the OFDMA signaling; and
- adjusting the modulation and coding scheme of sub-carriers adjacent to the frequency gap to a modulation and coding scheme that is more robust than the nominal modulation and coding scheme.

3. The method of claim 1, further comprising selecting a modulation and coding scheme to be used for the non-OFDMA signaling based on a second signal-to-interference value, wherein the OFDMA signaling acts as interference to the non-OFDMA signaling.

4. The method of claim 1, wherein:
- a first transmission power level is associated with the OFDMA signaling;
- a second transmission power level is associated with the non-OFDMA signaling; and
- the method further comprises selecting at least one of the first and second transmission power levels based on a first signal-to-interference condition, thereby adapting the first signal-to-interference value.

5. The method of claim 1, further comprising adapting the first signal-to-interference value by selecting the number of the one or more excluded sub-carriers based on a second signal-to-interference condition.

6. The method of claim 1, wherein:
- the OFDMA and non-OFDMA signaling comprise downlink signals; and
- the method further comprises concurrently transmitting the downlink signals.

7. The method of claim 6, wherein excluding the one or more sub-carriers from the OFDMA signaling comprises setting to zero inputs of an inverse fast Fourier transformer (IFFT), the inputs corresponding to the one or more sub-carriers.

8. The method of claim 1, wherein:
the OFDMA and non-OFDMA signaling comprise uplink signals; and
the method further comprises:
sending, to the OFDMA wireless communication devices, respective messages indicating the excluded sub-carriers and the selected modulation and coding scheme to be used for the OFDMA signaling; and
sending, to the non-OFDMA wireless communication device, a message indicating the center frequency.

9. The method of claim 8, further comprising:
concurrently receiving the uplink signals from the OFDMA wireless communication devices and from the non-OFDMA wireless communication device;
extracting the OFDMA signaling by excluding the one or more sub-carriers from an OFDMA demodulated signal; and
extracting the non-OFDMA signaling by filtering.

10. The method of claim 9, wherein excluding the one or more sub-carriers from the OFDMA demodulated signal comprises ignoring outputs of an inverse fast Fourier transformer (IFFT) that correspond to the one or more sub-carriers.

11. A non-transitory, computer-readable medium storing computer program instructions, wherein execution of the instructions by a controller of a network node adapts the network node to perform operations corresponding to the method of claim 1.

12. A link adaptation arrangement for a network node adapted to operate in concurrent association with one or more orthogonal frequency division multiple access (OFDMA) wireless communication devices using OFDMA signaling, and with a non-OFDMA wireless communication device using non-OFDMA signaling having a bandwidth that is smaller than a maximum bandwidth of the OFDMA signaling, the arrangement comprising a controller adapted to cause the arrangement to:
exclude of one or more sub-carriers from the OFDMA signaling to create a frequency gap;
determine a center frequency of the non-OFDMA signaling such that the center frequency is within the frequency gap; and
select a modulation and coding scheme to be used for the OFDMA signaling based on a first signal-to-interference value, wherein the non-OFDMA signaling acts as interference to the OFDMA signaling.

13. The arrangement of claim 12, wherein the controller is adapted to cause the arrangement to select the modulation and coding scheme to be used for the OFDMA signaling by:
selecting a nominal modulation and coding scheme for the OFDMA signaling; and
adjusting the modulation and coding scheme of sub-carriers adjacent to the frequency gap to a modulation and coding scheme that is more robust than the nominal modulation and coding scheme.

14. The arrangement of claim 12, wherein the controller is further adapted to cause the arrangement to select a modulation and coding scheme to be used for the non-OFDMA signaling based on a second signal-to-interference value, wherein the OFDMA signaling acts as interference to the non-OFDMA signaling.

15. The arrangement of claim 12, wherein:
a first transmission power level is associated with the OFDMA signaling;
a second transmission power level is associated with the non-OFDMA signaling; and
the controller is further adapted to cause the arrangement to select at least one of the first and second transmission power levels based on a first signal-to-interference condition, thereby adapting the first signal-to-interference value.

16. The arrangement of claim 12, wherein the controller is further adapted to cause the arrangement to adapt the first signal-to-interference value by selecting the number of the one or more excluded sub-carriers based on a second signal-to-interference condition.

17. The arrangement of claim 12, wherein:
the OFDMA and non-OFDMA signaling comprise downlink signals; and
the controller is further adapted to cause the arrangement to concurrently transmit the downlink signals.

18. The arrangement of claim 12, wherein:
the OFDMA and non-OFDMA signaling comprise uplink signals; and
the controller is further adapted to cause the arrangement to:
send, to the OFDMA wireless communication devices, of respective messages indicating the excluded sub-carriers and the selected modulation and coding scheme to be used for the OFDMA signaling; and
send, to the non-OFDMA wireless communication device, of a message indicating the center frequency.

19. The method of claim 18, wherein the controller is further adapted to cause the arrangement to:
concurrently receive the uplink signals from the OFDMA wireless communication devices and from the non-OFDMA wireless communication device;
extract the OFDMA signaling by exclusion of the one or more sub-carriers from an OFDMA demodulated signal; and
extract the non-OFDMA signaling by filtering.

20. A network node comprising the arrangement according to claim 12.

* * * * *

UNITED STATES PATENT AND TRADEMARK OFFICE
CERTIFICATE OF CORRECTION

| | | |
|---|---|---|
| PATENT NO. | : 11,165,619 B2 | Page 1 of 1 |
| APPLICATION NO. | : 16/344482 | |
| DATED | : November 2, 2021 | |
| INVENTOR(S) | : Leif Wilhelmsson | |

It is certified that error appears in the above-identified patent and that said Letters Patent is hereby corrected as shown below:

In the Claims

In Column 14, Line 43, in Claim 19, delete "The method of claim" and insert -- The arrangement of claim --, therefor.

Signed and Sealed this
Fourteenth Day of June, 2022

Katherine Kelly Vidal
*Director of the United States Patent and Trademark Office*